United States Patent [19]

Burton

[11] Patent Number: 5,240,611
[45] Date of Patent: * Aug. 31, 1993

[54] ORGANIC WASTE RECYCLING SYSTEM AND METHOD

[75] Inventor: R. Edward Burton, Willits, Calif.

[73] Assignee: Advanced Bio-Gest, Inc., Willits, Calif.

[*] Notice: The portion of the term of this patent subsequent to Nov. 21, 2006 has been disclaimed.

[21] Appl. No.: 790,679

[22] Filed: Nov. 8, 1991

Related U.S. Application Data

[63] Continuation-in-part of Ser. No. 659,457, Feb. 21, 1991, abandoned, and a continuation of Ser. No. 440,413, Nov. 17, 1989, abandoned, and a continuation of Ser. No. 192,487, May 11, 1988, abandoned.

[51] Int. Cl.$^5$ ............................................. C02F 3/04
[52] U.S. Cl. .................................. 210/603; 210/617; 210/622; 210/694; 210/151; 210/188; 210/196; 210/916; 435/311; 435/313
[58] Field of Search ............ 210/150, 151, 188, 195.1, 210/196, 257.1, 258, 261, 601, 615, 617, 618, 622, 631, 694, 916, 603; 435/311, 313; 71/9, 12, 13, 901; 201/620, 621

[56] References Cited

U.S. PATENT DOCUMENTS

| | | | |
|---|---|---|---|
| 681,884 | 9/1901 | Monjean | 210/617 |
| 3,803,029 | 4/1974 | Blechrezyk | 210/631 |
| 3,840,907 | 10/1974 | Sundberg | 4/133 |
| 3,894,355 | 7/1975 | Carothers | 210/617 |
| 4,062,770 | 12/1977 | Kneer | 210/916 |
| 4,249,929 | 2/1981 | Kneer | 71/13 |
| 4,274,966 | 6/1981 | Palmer | 210/150 |
| 4,303,528 | 12/1981 | Shibayama | 210/621 |
| 4,504,290 | 3/1985 | Pontius | 210/505 |
| 4,662,900 | 5/1987 | Ottengraf | 435/262 |
| 4,663,047 | 5/1987 | Krauthausen et al. | 210/616 |
| 4,882,058 | 1/1989 | Burton | 210/617 |

FOREIGN PATENT DOCUMENTS

| | | |
|---|---|---|
| 176912 | 4/1986 | European Pat. Off. . |
| 0176912 | 1/1988 | European Pat. Off. . |
| 526946 | 10/1972 | Fed. Rep. of Germany . |
| 7313966 | 4/1973 | France . |
| 2226206 | 11/1974 | France . |
| 8200716 | 1/1982 | France . |
| 2519966 | 7/1983 | France . |
| 526946 | 10/1972 | Switzerland . |
| 722852 | 3/1980 | U.S.S.R. . |
| 1498938 | 1/1978 | United Kingdom . |
| 1512566 | 6/1978 | United Kingdom . |

OTHER PUBLICATIONS

Carbon Adsorption Handbook, Chap. 13, "Biological Regeneration of Activated Carbon," Chem Ellerbusch of Ann Arbor Publishers Inc., 1978.

Primary Examiner—Stanley S. Silverman
Assistant Examiner—Christopher Upton
Attorney, Agent, or Firm—Flehr, Hohbach, Test, Albritton & Herbert

[57] ABSTRACT

System and method for converting and recycling liquid-borne organic waste materials from a processing plant. The waste material is passed through a compost bed containing a fecal material which processes the organic waste biologically, removes liquid from the waste by adsorption and absorption, and filters out colloidal particles. The compost bed may be mixed with other natural and/or synthetic materials to enhance aeration and/or digestion of the waste material. Any waste material which remains after passing through the compost bed is passed through a filter bed containing charcoal, rock and/or synthetic materials, then recycled through the compost and filter beds. Warm air is passed through the filter bed and the compost to provide aeration for the composting process and removes the adsorbed and absorbed water from these beds. The air is then passed through another charcoal filter bed, following which it is condensed. The condensate is returned to the processing plant from which the waste came or to another system or plant.

20 Claims, 1 Drawing Sheet

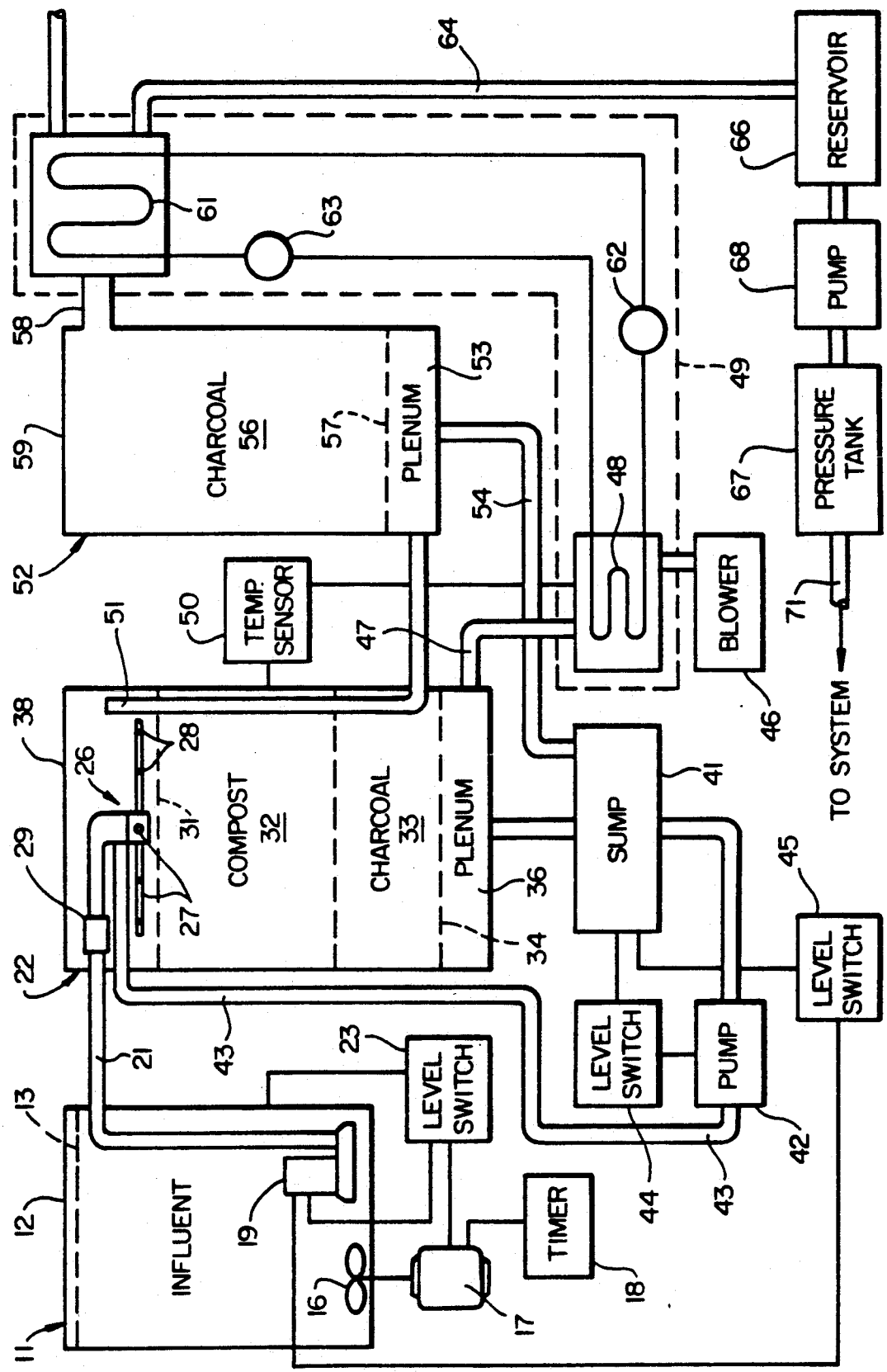

_5,240,611_

ORGANIC WASTE RECYCLING SYSTEM AND METHOD

This is a continuation-in-part of Ser. No. 07/659,457, filed Feb. 21, 1991, now abandoned, a continuation of Ser. No. 07/440,413, filed Nov. 17, 1989, now abandoned, a continuation of Ser. No. 07/192,487, filed May 11, 1988, now abandoned. This application is also related to U.S. Pat. No. 4,882,058, which issued on Ser. No. 07/247,245, filed Sep. 21, 1988 as a continuation-in-part of Ser. No. 07/192,487, filed May 11, 1988, now abandoned.

This invention pertains generally to waste processing, conversion and disposal, and more particularly to a system and method for recycling liquid-borne organic waste materials.

There are nutritive organic solutions and mixtures that have a rough balance of nitrogen available, organic carbon and other essentials. These liquids can be successfully processed by bubbling air (activated sludge) or by trickling down over media (trickling filters). Examples are toilet wastes, dish water and the like.

There are other non-nutritive solutions and mixtures of organics and inorganics that are almost completely devoid of nitrogen, available carbon or are toxic. Examples are paint and vehicle wash water, pesticide and herbicide wash water, and many other wastes from home and industry. These are classified as hazardous wastes which, under current laws, cannot be discharged to sewers.

The disposal of these organic materials presents a serious problem. The Environmental Protection Agency requires that hazardous or toxic materials be disposed of in a safe manner or stored in a Class I landfill site. The materials must be transported to the disposal site or the landfill site by a licensed and bonded carrier, and rigorous record keeping requirements must be met. This makes the disposal of such materials quite costly.

In the case of Class I landfill sites, there is a further problem in that the hazardous or toxic materials may still have to be disposed of at a later date in the event that the sites are eventually closed.

One method heretofore employed for disposing of such materials is incineration in specially designed incinerators such as the ones disclosed in U.S. Pat. Nos. 4,329,931 and 4,429,645. While incineration is adequate for some organic materials, others are volatile or explosive or give off fumes which are difficult to scrub to meet regulations. This has led to the prohibition of incineration as a disposal method for hazardous or infectious wastes in many areas.

Heretofore there have been efforts to neutralize and add the necessary elements to the hazardous liquid waste, then add a special type of bacteria designed to consume the pollutant. While this technique can be employed in a relatively small scale in a laboratory, it is difficult to manage outside the laboratory.

It is in general an object of the invention to provide a new and improved system and method for recycling organic waste materials.

Another object of the invention is to provide a system and method of the above character which overcome the limitations and disadvantages of techniques heretofore employed for the disposal of organic waste materials.

These and other objects are achieved in accordance with the invention by passing the waste material through a compost bed containing a fecal material which supports a microbiological community which in turn processes organic fractions biologically to convert the organic materials to carbon dioxide, water and energy. Any waste material which remains after passing through the compost bed is passed through a filter bed composed of charcoal, rock and/or synthetic materials, then recycled through the compost and filter beds. The liquid is adsorbed and absorbed onto and into the media in the compost bed and the filter bed, and warm air is passed through these beds to provide aeration for the composting process and to remove the adsorbed and absorbed water. The air is then passed through another charcoal filter bed, then condensed, and the condensate is returned to the system which generated the waste material.

The single figure of drawing is a block diagram of one embodiment of an organic waste recycling system according to the invention.

Organic waste materials are generally liquid-borne, e.g. in water or a solvent. Substantially all such materials are made up principally of carbon, hydrogen and oxygen, with a few inorganic molecules in their chains. Such materials might, for example, come from a processing plant, or other similar facility.

As illustrated in the drawing, the system for recycling the waste materials includes an influent tank 11 which has a removable lid 12 through which the materials can be introduced into the system. A mesh screen 13 is positioned toward the top of the tank for screening out gross solids.

An agitator 16 driven by a motor 17 is mounted in the lower portion of the tank for stirring the material in the tank. The agitator motor is turned on periodically by a timer 18 for a suitable period of time, e.g. a period of 8 seconds every hour.

A pump 19 pumps the liquid-borne waste material from influent tank 11 through a line 21 to a processing tank 22. In the embodiment illustrated, pump 19 is a submersible pump, but it could just as well be located outside the tank, if desired. A level switch 23 cuts off the power to agitator motor 17 and pump 19 in the event that the liquid in the influent tank drops below a predetermined level.

The waste material is introduced into the processing tank 22 through a sprinkler 26 which has a plurality of radially extending arms 27 with discharge openings 28. The sprinkler is removably connected to line 21 by a connector 29, and the sprinkler arms are rotated about a vertically extending axis by the waste material discharged through orifices 28.

A screen 31 is mounted in the upper portion of tank 22 below sprinkler assembly 26, and the waste material introduced through the sprinkler passes through this screen.

A compost bed 32 is located in the upper portion of tank 22. The compost contains a fecal material which contains bacteria, fungi and higher organisms such as insects and worms which process the organic waste material biologically and convert it to carbon dioxide, water and energy in the form of heat. The compost also contains a cellulose fiber which serves as a filter for removing colloidal solids from the waste material. A presently preferred composting material is horse manure which contains cellulose in the form of undigested hay. Other types of manure can be utilized, if desired, and other microorganisms can be included in the compost bed in order to enhance digestion of the waste material. Such microorganisms can be derived naturally or otherwise, and can, for example, be in the form of prepared inoculums containing microbes which are specifically adapted to enhance digestion of the waste material. Porous materials such as expanded shale rock and/or other natural or synthetic materials can be included in the compost bed to increase aeration. If the waste material to be processed is acidic, a basic material such as oyster shell or limestone gravel can be mixed in with the manure.

A filter bed 33 is located in the processing tank beneath the compost bed. The filter bed comprises a bed of charcoal, rock and/or synthetic material which rests on a screen 34. In one presently preferred embodiment, the filter material is in the form of granules or particles having a diameter on the order of about ⅜ inch, but other sizes of particles can be employed, depending upon the characteristics of the material being processed.

A plenum chamber 36 is formed in the lower portion of tank 22 beneath screen 34.

Tank 22 is sealed at the top by a lid 38 which can be removed to replace the compost material in compost bed 32 and the material in filter bed 33.

A sump 41 is positioned beneath the processing tank to collect any waste material which passes through the compost bed and the filter bed. This material is returned to sprinkler 26 in tank 22 by a pump 42 and a return line 43. Operation of the sump pump is controlled by a level switch 44 which actuates that pump when the liquid in the sump is above a predetermined level. A second level switch 45 in sump 41 actuates pump 19 to deliver additional waste material to chamber 22 when the liquid in the sump drops below a predetermined level.

Means is provided for circulating warm air in an upward direction through filter bed 33 and compost bed 32. This means includes a blower 46 which delivers the air to plenum chamber 36 via an air duct 47. The air in the duct is warmed by the heating coils 48 of a heat pump 49 which is controlled by a temperature sensor 50. The temperature sensor monitors the temperature of the compost material and maintains the air in the duct at a temperature on the order of 80°-120° F.

After passing through the filter and compost beds, the air passes from the processing tank through an air duct 51 to a filter tank 52. Duct 51 extends vertically within tank 22, with the upper end of the duct being positioned above the compost material in the tank. The duct passes through the side wall of the tank to a plenum chamber 53 in the lower portion of tank 52. A drain line 54 runs from plenum chamber 53 to sump 41 for removing condensate from the air duct and the plenum chamber.

Tank 52 contains a bed of filter material 56 such as charcoal, rock and/or synthetic material, which rests on a screen 57 at the top of plenum chamber 53. A discharge opening 58 for the effluvia air is provided toward the top of tank 52. This tank also has a lid 59 which can be removed to replace the material in the filter bed.

The effluvia air from tank 52 is cooled and condensed from a temperature of about 106° F. and a dewpoint of about 96° F. to a temperature of about 80° F. and a dewpoint of about 80° F. by the condensing coils 61 of heat pump 49. The heat pump also has a compressor 62 and an expansion valve 63. The condensate thus formed passes through a drain line 64 to a reservoir 66 where it is collected, then delivered to a pressure tank 67 by a pump 68. From the pressure tank, the condensate is returned by a return line 71 to a processing station such as the system from which the waste material being processed came, another system or a processing plant.

Operation and use of the waste recovery system, and therein the method of the invention, are as follows. The filter beds are formed in tanks 22 and 52, and the compost bed is formed in tank 22. Lids 38 and 59 are closed to seal tanks 22 and 52, respectively, and blower 46 is turned on.

The material to be processed is pumped or poured into influent tank 11, and pump 19 is actuated to pump the waste material from the influent tank to the processing tank. Agitator 16 is actuated periodically to stir up the waste material in the influent tank.

As the liquid-borne waste material passes slowly down through the compost bed, the microorganisms in the fecal material in the compost material convert the organic waste to carbon dioxide, water and heat, and the colloidal solids are filtered out onto the cellulose fiber and the bacterial masses in the fecal material. Some of the water or solvent is adsorbed on and absorbed in the compost material. The remaining liquid passes down through filter bed 33 where more of the solids are adsorbed onto the surface of the charcoal, rock and/or synthetic granules. The liquid then passes through screen 34 and plenum chamber 36 to sump 41. When the liquid in the sump reaches the level set by switch 44, pump 42 is actuated, and the leached liquid is returned to the processing tank for further processing. The amount of liquid returned is typically on the order of about one-tenth of the liquid introduced into the processing tank, and all of the liquid is eventually evaporated upon successive passes through the processing tank.

The air from blower 46 is heated, if necessary, and passes in an upward direction through filter bed 33 and compost bed 32. As the warm air passes through these beds, water and some of the solvents are evaporated and carried off. The air also serves to provide aeration for the composting process.

Since tank 22 is sealed, the air leaving the compost bed is forced through air duct 51 to plenum chamber 53, then up through filter bed 56 and out through discharge opening 58. Any odors or gases produced by the compost are effectively filtered out by the charcoal, rock and/or synthetic material, and the filter beds are sized so that bioregeneration converts the gases and odors to carbon dioxide and water within the beds. Any condensate in air duct 51 is drained off to sump 41 by drain line 54.

The effluvia discharged from tank 22 is cooled and condensed by the condenser coils 61 in heat pump 49, and the condensate is collected in reservoir 66. From reservoir 66, the condensate is pumped to pressure tank 68 and returned to a processing station such as the system from which the waste came, another system or a processing plant.

The compost material is to some extent consumed by the process, and it should be replenished periodically. Eventually, there will be a build-up of undigestible inorganic materials in the compost chamber. When this happens, these materials should be removed and disposed of in a Class I landfill or in another approved manner.

The effluvia is tested periodically to determine when the charcoal and/or other filter material is beginning to lose its effectiveness as a filter. At that point, the filter material is removed and replaced, and the spent charcoal can be sent to a charcoal regenerator for renewal.

The invention creates a habitat not only for bacteria but also higher organisms such as nematodes, fungi, yeast, amoebas and countless other varieties of life which feed on the pollutants and on each other. In other words, it provides a food chain supported in part by the biota and nutrients in the manure and feeding on the toxic and non-nutritive elements of the organic waste material.

The manure contains plentiful amounts of organic carbon and a habitat for the organisms. It also contains nitrogen, phosphate, potassium and other elements necessary for life. Depending on the waste being processed, it may be necessary to add more nitrogen, potassium and phosphorous.

In some cases, the toxic elements may kill only a portion of the organisms, with others surviving to produce offspring that are resistant to the toxic being processed. This is similar to what happens when "pests" develop a resistance to pesticides. In general, all organics can be consumed and broken down into carbon dioxide and water. This is particularly true if the biota has mouth parts and an active digestive tract. It has been found that horse manure has a particularly good combination of the properties necessary to filter out and adsorb the pollutants while providing an ideal habitat for aggressive organisms.

The horse manure and the filter section act as evaporative cooling towers as the water is driven off, making it particularly advantageous to use the heat from the compressor element of the heat pump as a heat source and to use the expansion coil section to condense the water vapor into demineralized water. This water can then be utilized for any number of purposes in the factory or other location in which the waste material is generated.

The invention has a number of important features and advantages. It effectively disposes of liquid-borne organic waste materials which heretofore have been very difficult to dispose of. Moreover, it does so in a manner which is substantially more economical than the techniques heretofore employed for disposing of such wastes.

Hazardous waste water placed in a reservoir is pumped automatically at time intervals and for timed duration to a digestion chamber. It is spread on the special digestion filter medium where the solids are digested biologically and filtered. Warm air passes up through the digestion medium, maintaining it in an aerobic condition for the optimum digestion of the solids. The warm air rising through the digestion medium also acts to evaporate liquids. Products of the digestion and evaporation processes are carried by the air flow from the digestion chamber through an activated carbon filter which removes the organic gases. Gases trapped in the carbon filter are further converted by bio-regeneration. Filtered air and water vapor are routed to a condenser chamber where the water vapor is condensed and can be returned to the factory processes for re-use. The carbon dioxide is discharged into the atmosphere. The effluvium has been found to be substantially free of environmental contaminants.

It is apparent from the foregoing that a new and improved system and method for recycling organic waste materials have been provided. While only certain presently preferred embodiments have been described in detail, as will be apparent to those familiar with the art, certain changes and modifications can be made without departing from the scope of the invention as defined by the following claims.

I claim:

1. A system for processing a liquid-borne organic waste material to recover a useful liquid, comprising a compost bed containing microorganisms for biological processing of the organic waste material, means for passing the waste material through the compost bed to substantially convert the organic material to carbon dioxide and water, a filter bed, means for passing a gas through the compost bed and thereafter through the filter bed, means for condensing the gas to form a condensate after the gas passes through the compost and filter beds, and means for discharging the condensate from the system.

2. The system of claim 1 wherein the compost bed contains horse manure.

3. The system of claim 1 wherein the compost bed includes a cellulose material which serves as a filter for removing colloidal particles from the waste material.

4. The system of claim 1 wherein the compost bed includes a porous material for increasing aeration within the compost bed.

5. The system of claim 1 wherein the filter bed contains particles selected from the group consisting of charcoal, rock, a synthetic material, and combinations thereof.

6. The system of claim 1 including a second filter bed through which the liquid waste is passed after it passes through the compost bed.

7. The system of claim 6 wherein the second filter bed contains particles selected from the group consisting of charcoal, rock, a synthetic material, and combinations thereof.

8. The system of claim 1 including means for collecting liquid which passes through the compost bed and passing the collected liquid through the compost bed again.

9. The system of claim 1 including means for heating the gas to a temperature on the order of 80°–120° F. before it is passed through the compost bed.

10. A system for processing a liquid-borne organic waste material to recover a useful liquid, comprising an influent tank for holding the waste material, a compost bed containing microorganisms for biological processing of the organic waste material, means for transferring the waste material from the influent tank to the upper portion of the compost bed and permitting the waste material to pass in a downward direction through the compost bed to substantially convert the waste material to carbon dioxide and water, a first filter bed positioned beneath and in communication with the compost bed so that the waste material passes in a downward direction through the filter bed after passing through the compost bed, a second filter bed, means for passing air in an upward direction through the first filter bed and the compost bed and through the second filter bed, means for condensing vapor in the air to form a condensate after the air passes through the compost and filter beds, and means for discharging the condensate from the system.

11. The system of claim 10 wherein the compost bed contains horse manure.

12. The system of claim 10 wherein the compost bed includes a cellulose material which serves as a filter for removing colloidal particles from the waste material.

13. The system of claim 10 wherein the compost bed includes a porous material for increasing aeration within the compost bed.

14. The system of claim 10 wherein the first and second filter beds each contain particles of a material selected from the group consisting of charcoal, rock, a synthetic material, and combinations thereof.

15. The system of claim 10 including means for collecting waste material which passes through the compost bed and the first filter bed, and means for returning the collected waste material to the compost bed.

16. The system of claim 10 including means for heating the air to a temperature on the order of 80°–120° F. before it is passed through the compost bed.

17. A method of processing a liquid-borne organic waste material to recover a useful liquid, comprising the steps of: passing the waste material through a compost material to substantially convert the organic waste material to carbon dioxide and water, passing air through the compost material, thereafter passing the air through a filter bed, condensing water vapor in the air from the filter bed to form a condensate, and collecting the condensate.

18. The method of claim 17 wherein the waste material and the air are passed through the compost material in opposite directions.

19. The method of claim 17 including the steps of collecting any waste material which passes through the compost material, and passing the collected waste material through the compost material again.

20. The method of claim 17 including the step of heating the air to a temperature on the order of 80°–120° F. before it is passed through the compost material.

* * * * *